Oct. 23, 1962
N. M. SULLIVAN
3,059,747
TELESCOPING CONVEYER
Filed Dec. 28, 1959
3 Sheets-Sheet 1
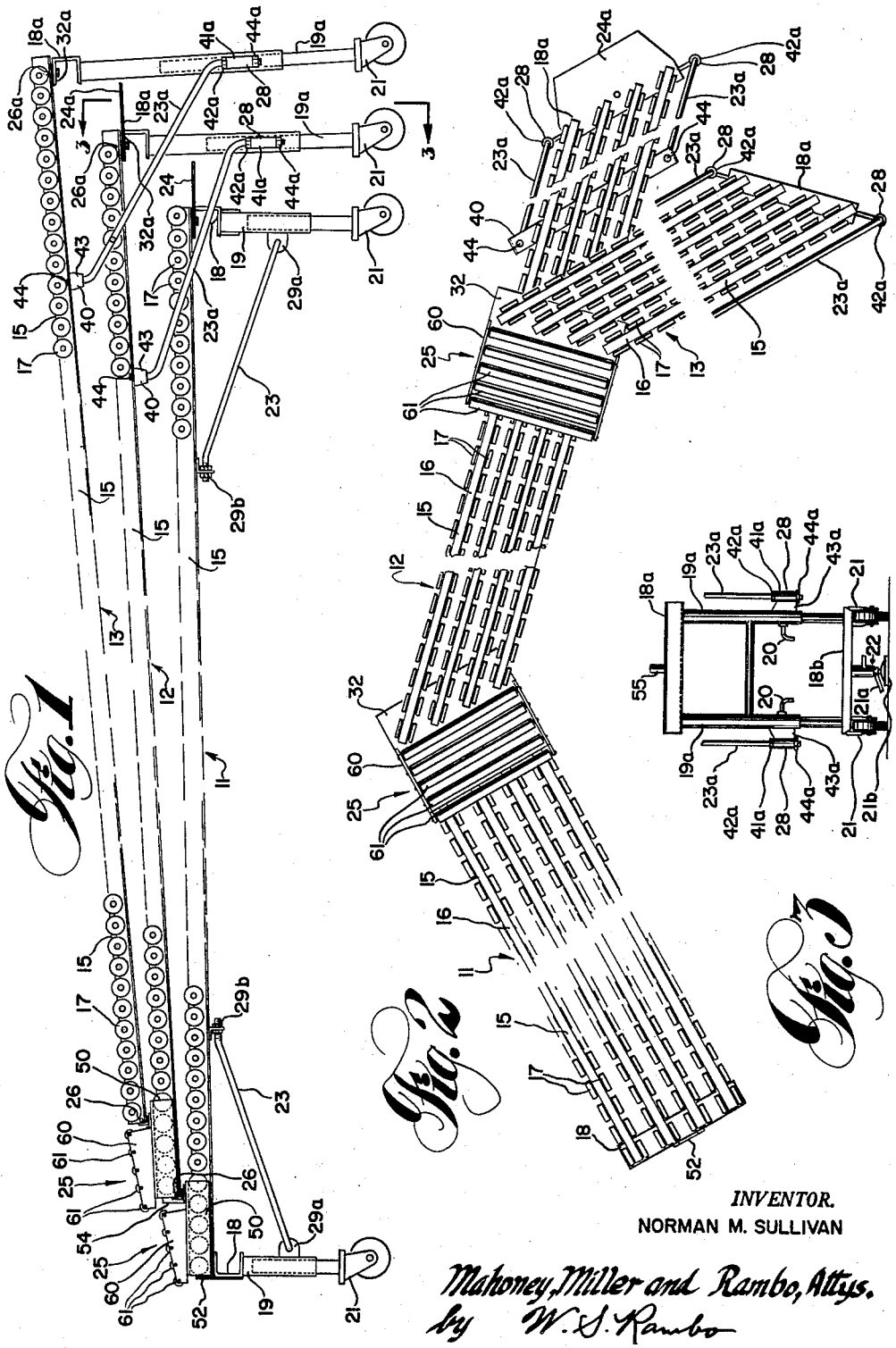
INVENTOR.
NORMAN M. SULLIVAN
Mahoney, Miller and Rambo, Attys.
by W. S. Rambo Oct. 23, 1962  N. M. SULLIVAN  3,059,747
TELESCOPING CONVEYER
Filed Dec. 28, 1959  3 Sheets-Sheet 2

INVENTOR.
NORMAN M. SULLIVAN
Mahoney, Miller and Rambo, Attys.
by W. S. Rambo

Oct. 23, 1962 N. M. SULLIVAN 3,059,747
TELESCOPING CONVEYER
Filed Dec. 28, 1959 3 Sheets-Sheet 3
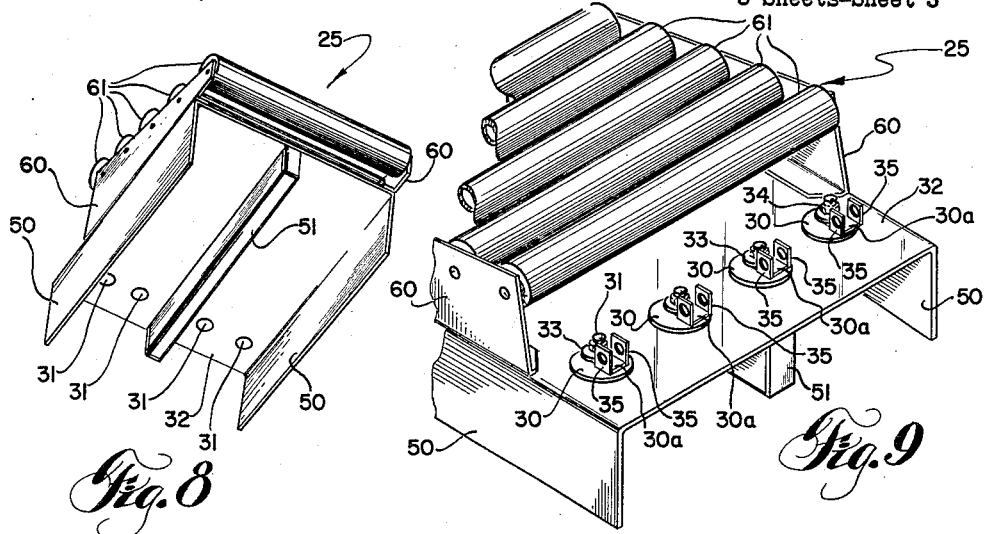
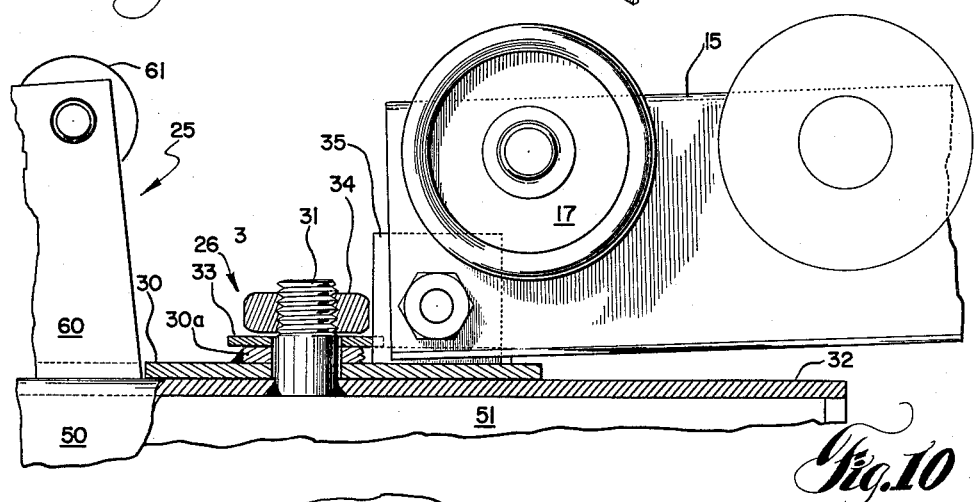
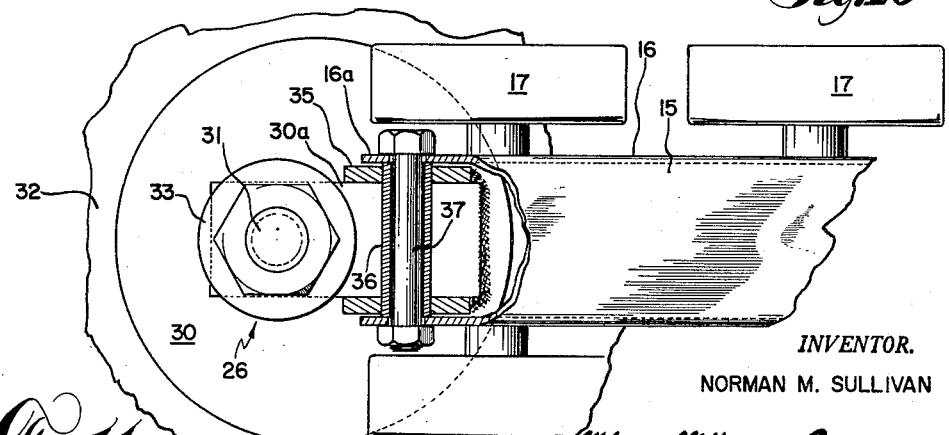
INVENTOR.
NORMAN M. SULLIVAN
Mahoney, Miller and Rambo, Attys.
by W. A. Rambo United States Patent Office 3,059,747
Patented Oct. 23, 1962

3,059,747
TELESCOPING CONVEYER
Norman M. Sullivan, Cincinnati, Ohio, assignor to The Alvey-Ferguson Company, Cincinnati, Ohio, a corporation of Ohio
Filed Dec. 28, 1959, Ser. No. 862,239
16 Claims. (Cl. 193—35)

This invention relates to a telescoping conveyer. It has to do, more particularly, with a conveyer of the antifriction type along which articles feed by gravity and which is composed of a plurality of telescoping sections which can be extended and retracted. More specifically, it relates to a conveyer of the gravity-feed type in which the sections include conveyer rails for supporting articles for movement therealong.

Telescoping conveyers of the gravity-feed type have been provided in the past and have been composed of sections which permit extension and retraction to different lengths. However, these sections have not been transversely angularly adjustable relative to each other to permit transverse skewing of the conveyer sections. The result is that such prior art conveyers have only been suitable for straight-line installation and could not be used where is is necessary to angle through doors or openings in trucks, railway cars, or buildings, or around objects such as roof-supporting columns, stacks of cases, etc.

It is the main object of this invention to provide a conveyer of the telescoping section type in which the sections are so connected together that they may be angularly adjusted transversely so that the conveyer can be used as a straight-line conveyer or any section can be skewed transversely as desired relative to its adjacent section or sections so that the conveyer can angle around objects as desired.

Another object of this invention is to provide a conveyer of the type indicated composed of angularly adjustable telescoping sections in which the sections can be extended or retracted when in linear alignment but also in which the end of one section can be moved along the length of an adjacent section even when it is angularly disposed relative thereto.

A further object of this invention is to provide a telescoping conveyer of the anti-friction type in which gravity feed is accomplished by having the sections inclined and in which the sections are so connected that angular positioning of one section relative to an adjacent section at any position along said section is possible regardless of the inclination.

Still another object of this invention is to provide a conveyer of the type indicated above in which the height and inclination of the sections is adjustable without interferring with the connections therebetween.

Various other objects will be apparent.

According to this invention the telescoping adjacent sections of the gravity feed conveyer are connected together by means of transfer units. Each of these transfer units also includes rolling elements over which the articles can move from one of the main conveyer sections to an adjacent main conveyer section. Each of the main conveyer sections includes longitudinally extending conveyer rails disposed in laterally spaced relationship and each rail is connected by a universal pivot connection to the cooperating transfer unit to permit both vertical and transverse swinging of the rails relative to the transfer unit, which is required in the relative adjustment of the main conveyer sections. Guide means is associated with each transfer unit for keeping it aligned on the conveyer rails of an adjacent section. In addition, stop means is provided between each transfer unit and the adjacent main conveyer section to limit relative extension of such sections so that they can not pull apart. Also, each conveyer section is provided with adjustable legs or standards by means of which its height and inclination can be varied.

The preferred embodiment of this invention is illustrated in the accompanying drawings but it is to be understood that specific details thereof may be varied without departing from basic principles.

In these drawings:

FIGURE 1 is a side elevational view illustrating a conveyer according to this invention having its telescoping sections in retracted or nested relationship.

FIGURE 2 is a diagramattic plan view illustrating relative angular adjustment of the sections possible with this invention.

FIGURE 3 is a rear elevational view on a reduced scale of one of the conveyer sections taken from the position indicated by line 3—3 of FIGURE 1.

FIGURE 8 is a perspective view of the lower side of one of the transfer units of the conveyer.

FIGURE 9 is a perspective view, partly broken away, of the upper side of the transfer unit.

FIGURE 10 is an enlarged detail, partly in side elevation and partly in vertical section, illustrating the connection of the conveyer rails to the adjacent transfer unit.

FIGURE 11 is a plan view, partly broken away, of the connection of FIGURE 10

Figure 4:
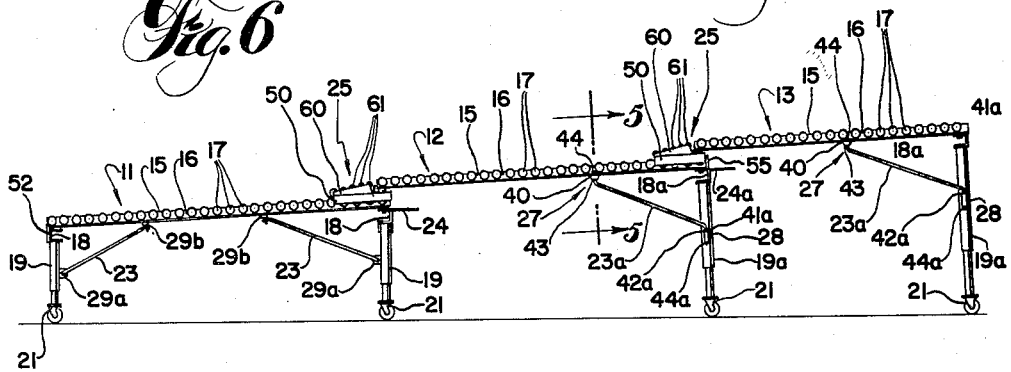
FIGURE 4 is a digrammatic view in side elevation illustrating the conveyer sections of FIGURE 1 in relatively extended condition.

With reference to the drawings, there is illustrated in FIGURE 1 a gravity feed conveyer constructed according to this invention and which is shown as comprising three main sections, namely, a lower or discharge section 11, an intermediate section 12, and an upper or loading section 13. However, any number of cooperating sections may be used. When the conveyer is not in use, or when a conveyer of minimum length is needed, the sections 11, 12 and 13 are retracted in nested relationship, as shown in FIGURE 1. However, they may be extended when a conveyer of greater length is required, as indicated in FIGURES 2 and 4. As will appear later, the discharge section 11 is somewhat different in structure from the sections 12 and 13 which are almost identical.

Figures 6, 7:
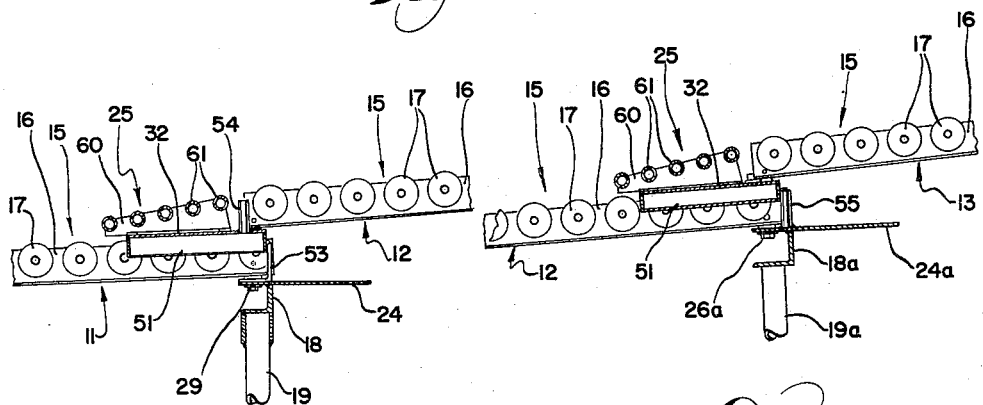
FIGURE 6 is a vertical longitudinal sectional view showing the connection between the lowermost main conveyer section and the intermediate main conveyer section.
FIGURE 7 is a similar view showing the connection between the intermediate main conveyer section and the uppermost conveyer section.

The lower section 11 is composed of a plurality of conveyer rails 15 which are disposed in longitudinally extending, fixed laterally spaced, parallel relationship. Each rail 15 embodies an inverted channel member 16 having anti-friction or rolling elements in the form of pairs of wheels 17 carried on transverse axes at longitudinally spaced intervals, the wheels projecting up above the top surface of the rail, as shown in FIGURE 6. In the section 11, the rails 15 are rigidly connected at each end to a transverse support or channel 18 of a support stand as indicated at 29 in FIGURE 6. Each support 18 is carried on the upper ends of legs 19 of a pair. Each leg 19 is preferably of the telescoping type and may be fixed in adjusted vertical position by means of a set screw 20 which is not visible on the section 11 but which is shown in FIGURE 3 on one of the other conveyer sections. By means of these telescoping legs 19, the height and inclination of the conveyer section 11 can be varied. Each leg 19 of the stand is supported at its lower end by means of a caster wheel unit 21 and between the pair of caster wheels at the lower end of the stand is a brake unit 22. This brake unit is supported by the lower transverse support 18b of the stand and includes a pivoted actuating bell crank lever 21a which can be actuated to move a shoe 21b, pivotally carried thereby, into and out of engagement with the surface over which the wheels of the caster wheel unit 21 roll. Each leg 19 is braced by means of a rigid diagonal or knee brace 23 (FIGURE 1) which has its lower end rigidly connected to the leg intermediate its height as at 29a and its upper end rigidly connected to the transverse single support 29b which is associated with the rails 15. From the rearmost support 18, a plate 24 projects horizontally rearwardly and has rearwardly converging side edges.

As indicated above, the conveyer sections 12 and 13 are somewhat different from the conveyer section 11. Each conveyer section 12 and 13 has a transfer unit 25 mounted at its lower or forward end. The rails 15 of each of the units 12 and 13 are in longitudinally extending, laterally spaced, parallel relationship but are mounted in a somewhat different manner from the rails of the section 11. Each lower or forward end of each rail 15 of each section 12 or 13 is pivotally connected at 26 (FIGURES 1 and 6) to the cooperating transfer unit 25. The upper or rear end of each of such rails 15 is pivotally connected at 26a to the rear transverse support 18a of the conveyer section. Each of the pivots 26 is a universal pivot allowing vertical as well as transverse swinging movement of the rail 15. The pivots 26a are practically identical in structure but different in function as will later appear.

The pairs of rear legs 19a which are connected to the rear support members 18a of the respective conveyer sections 12 and 13 are identical with the legs 19 of the section 11. However, the braces 23a therefor (FIGURES 1, 3 and 5) are connected at their upper and lower ends for lateral swinging by means of the upper pivots 27 and the lower pivots 28. The pivots 27 are shown in detail in FIGURE 5 and the pivots 28 are shown in detail in FIGURE 3 and both provide vertically disposed pivot axes about which the knee braces 23a swing. The support 18a of the intermediate conveyer section 12 is provided with a rearwardly projecting plate 24a similar to the previously mentioned plate 24.

The universal pivots 26 are shown in detail in FIGURES 9 to 11 and, since as indicated above, the pivots 26 and 26a are identical in structure, the pivots 26 will be described specifically. Each pivot 26 includes the bearing plate or disc 30 which is rotatable about an upstanding pivot pin or bolt 31 that is fixed to a supporting plate which in this instance, is the plate 32 that is part of the transfer unit 25. The plate 30 has a spacer 30a welded to its upper surface and above this spacer is a washer 33 loose on the pin 31. A nut 34 is threaded on the upper end of the pin 31. Rearward of the pivot pin 31, the plate 30 has a U-shaped pivot bracket 35 fixed thereon having aligned openings for receiving a transverse pivot bushing 36. A pivot bolt 37 is passed through this bushing and aligned openings in the depending flanges 16a of the channel member 16 of the rail 15 which straddles the bracket 35. Thus, this pivotal connection provides for vertical swinging movement of the rail 15 about the horizontal axis of the bolt 37 and lateral or transverse swinging of the rail about the vertical axis of the pivot pin 31.

The pivots 26a at the rear ends of the rails 15 of the conveyer sections 12 and 13 are identical in structure but the bearing plates 30 thereof are carried by the upper flanges 32a of the transverse rear supports 18a of the conveyer sections 12 and 13. The pivots 26a function differently from the pivots 26 since vertical swinging movement of the rails 15 at the pivots 26a is not necessary in use of the conveyer sections. However, the vertical swinging of the rails 15 at the pivots 26a does facilitate assembly of the conveyer sections.

Figure 5:
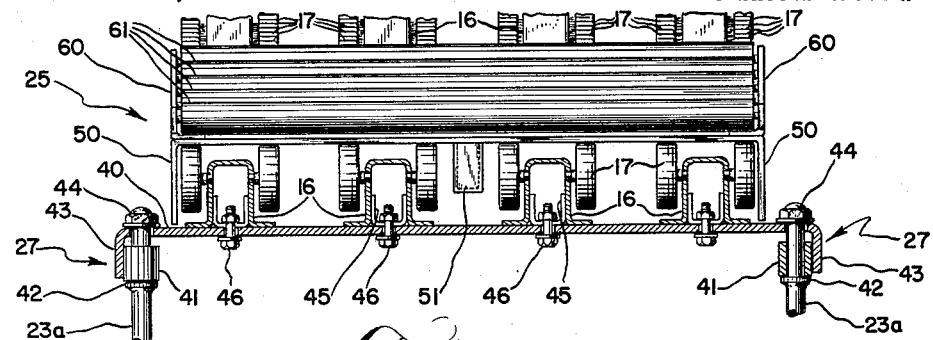
FIGURE 5 is an enlarged transverse sectional view through a main conveyer section and associated transfer unit taken, for example, at the location indicated by the line 5—5 of FIGURE 4.

As shown in FIGURE 5, the upper ends of the braces 23a are pivoted to a transversely extending rail-supporting member 40. The ends of this member 40 carry the pivots 27, each of which includes a bushing 41 welded inside a depending lug 43 on the end of the member 40. The upper end of the brace 23a is rotatably disposed in the bushing 41 and in an opening in the member 40. Such end carries a cap 44 above the member 40 and a collar 42 below the bushing 41 to keep it located properly vertically relative to the member 40. The member 40 carries on its upper surface spacer clips 45 which are pivoted to such member for relative swinging about vertical axes by bolts 46. The channels 16 of the rails 15 straddle the clips 45. The pivot 28 at the lower end of each rod 23a, as shown in FIGURE 3, comprises a vertically disposed pivot sleeve 41a which is attached to the associated leg 19a by a lug 43a. A stop shoulder 42a is provided on the rod 23a above the sleeve 41a and a nut 44a is threaded on the lower end of the rod to keep the rod in proper vertical relationship with the sleeve 41a.

The transfer units 25 are practically identical and each is of the structure illustrated best in FIGURES 8 and 9. Each includes the supporting plate 32 which has the depending longitudinally extending flanges 50 along each side thereof. These flanges 50 overlap the wheels 17 on the outermost rail 15 of the conveyer section 11 or 12 on which the respective forward and rearward transfer units rest. Intermediate the flanges 50 is a parallel longitudinally extending guide member 51 of less depth but of the same length as the flanges 50. This member 51 is adapted to fit between the two conveyer rails 15 at the center of the conveyer section on which the transfer unit 25 rests. Each unit 25 will rest on the wheels 17 of the conveyer section 11 or 12, that is, on the wheels of the conveyer section next below that to which the transfer unit is connected. Each transfer unit 25 may be moved to different positions along the conveyer section which supports it and it will be guided during this movement by the guide member 51 which will be disposed between the two center rails 15. The lowermost or forwardmost position of the forward unit 25 resting on the conveyer section 11 will be determined by an upstanding stop shown as a flange 52 (FIGURE 1) on the cross support 18 at the front of the conveyer section 11 with which the front end of the guide member 51 will contact. The rearwardmost position of this unit 25 is determined by a similar stop shown as a flange 53 on the rear member 18 (FIGURE 6) for contacting with the rear end of the same guide member 51. The forwardmost position of the rear transfer unit 25 resting on the conveyer section 12 is determined by an upstanding stop pin 54 (FIGURES 1 and 6) which projects upwardly from the forwardmost unit 25 which is connected to the rails 15 of the conveyer section 12. The rearwardmost postion of this unit 25 along the conveyer section 12 is determined by an upstanding stop pin 55 (FIGURE 7) projecting upwardly from the transverse support 18a at the rear end of the conveyer section 12. Thus, the forward and rearward positions of the forwardmost transfer unit 25 along the conveyer section 11 is determined by the stops 52 and 53 and the forward and rearwardmost positions of the rear transfer unit 25 along the conveyer section 12 is determined by the stops 54 and 55, the guides 51 on the respective transfer units cooperating with these stops.

Each transfer unit 25 also includes the upstanding longitudinally extending supporting flanges 60 which project upwardly from the plate 32 adjacent and opposite the depending flanges 50 thereon. These upstanding flanges 60 carry suitable anti-friction or rolling elements 61. The rolling elements are shown as being in the form of single rollers bridging the space between the flanges 60 but a plurality of laterally spaced wheels similar to the wheels 17 and carried by a single shaft bridging such space could be used. The rollers 61 are supported on the flanges 60 in a downwardly and forwardly inclined plane. The uppermost roller 61 has its upper surface substantially flush with the upper surface of the lowermost wheel 17 at the lower or forward end of the conveyer section 12 or 13 to which it is connected. The flanges 60 of the transfer unit project forwardly beyond the plate 32, as shown in FIGURE 1, so that the lower end of the upper transfer unit 25 will be closely adjacent and above the forwardmost transfer unit and the forward end of the latter unit will extend beyond the associated end of the conveyer section 11 when the conveyer sections are in the nested condition shown in FIGURE 1. Also, when extended, this insures that each transfer unit will overlap the rearwardmost wheels 17 of the next lower conveyer section, as illustrated in FIGURE 4.

It will be apparent that with this telescoping conveyer arrangement, the conveyer sections may be retracted or nested as shown in FIGURE 1, or may be extended as far as possible, as shown in FIGURE 4. In nested condition, the stop 52 limits the forwardmost position of the conveyer section 12 relative to the conveyer section 11 and the stop 54 limits the forwardmost position of the conveyer section 13 relative to the conveyer section 12. In moving the conveyer sections into nested condition, the plates 24 and 24a serve as guide members to help in aligning the sections during nesting. The beveled or converging edges of the plates 24 and 24a cooperate with the associated knee braces 23a of the section into which the nesting is to be done. In extended condition, the stop 53 limits the rearwardmost position of the conveyer section 12 relative to the conveyer section 11 and the stop 55 limits the rearwardmost position of the conveyer section 13 relative to the conveyer section 12.

Any conveyer section may be angularly disposed transversely relative to the adjacent section, as suggested in FIGURE 2. To accomplish this, each section may be swung laterally relative to its adjacent section when the sections are in extended or partially extended condition. Also, it is possible to move either transfer unit 25 to an intermediate position on its supporting conveyer section at the same time that the angular adjustment is made. For example, as shown in FIGURE 2, the rear unit 25 can be moved along the conveyer section 12 to a position intermediate its ends. At the same time, the section 13 can be angularly disposed relative to the section 12. After the required adjustments are made, the stands which are supported by wheel units 21 can be locked by means of the brake units 22 to prevent movement of the transfer unit 25 downwardly along its supporting conveyer. During the angular adjustment of either of the conveyer sections 12 or 13, the conveyer rails 15 will swing about their respective pivots 26 and 26a. At this time, the spacing of the rails will change and their angularity relative to the transverse supports 18a and 40 will vary. However, the rails 15 will always be parallel with each other and the members 18a and 40 will always be parallel as shown in FIGURE 2. During the transverse swinging of the rails 15, the braces 23a swing laterally and the rails 15 will rotate on the clips 45 which will pivot on the bolts 26. Furthermore, as the transfer units 25 are moved to different positions along the supporting conveyer sections 11 and 12, the rails 15 connected thereto may move vertically about their pivots 26. Thus, regardless of the inclination of the supporting conveyer section, this will not interfere with adjustment of the cooperating transfer unit therealong. As the lower ends of the rails 15 move vertically, the entire conveyer section will pivot about the axes of the wheel units 21 at the rear end of the conveyer section.

It will be apparent from the above description that this invention provides for a conveyer of the telescoping section gravity feed type in which the sections are so connected together that they may be adjusted angularly transversely as well as extended and retracted. Furthermore, the sections can be adjusted relatively so that one section will angle from its adjacent section at any selected position intermediate its length.

Although the sections can be adjusted to different inclinations and heights, this will not interfere with the angular adjustment of one section relative to the other or with the adjustment of the end of one section along the length of the adjacent section.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A conveyer structure composed of a plurality of elongated conveyer sections which can be retracted relatively longitudinally into an overlapping nested condition or extended relatively longitudinally from said nested condition, and means operatively connecting one section to an adjacent section for said longitudinal relative movement into varying degrees of overlapping relationship, said connecting means including a connection for angular adjustment of said connected sections relatively transversely.

2. A conveyer structure composed of a plurality of vertically spaced conveyer sections which can be extended and retracted relative to a nested condition, and a transfer unit between adjacent sections for operatively connecting them together for the relative extension and retraction thereof, said transfer unit being mounted on one of said sections and connected to the end of the adjacent section for relative transverse angular adjustment of said adjacent section.

3. A conveyer structure according to claim 2 in which said transfer unit is mounted for movement along its supporting conveyer section.

4. A conveyer structure according to claim 3 in which said adjacent conveyer section is connected to said transfer unit for both relative transverse and vertical swinging movement.

5. A conveyer structure composed of a plurality of vertically spaced conveyer sections which can be extended and retracted relatively, transfer units for connecting adjacent sections together for the relative extension and retraction thereof, each transfer unit being supported on one section and being connected to an adjacent section, said adjacent section comprising conveyer rails which are in transversely spaced longitudinally extending relationship, said rails being pivoted to said transfer unit for transverse swinging movement.

6. A conveyer structure according to claim 5 in which said rails are pivoted to said transfer unit for both transverse and vertical swinging movement.

7. A conveyer structure according to claim 6 in which said transfer unit is supported for movement along the one conveyer section.

8. A conveyer structure according to claim 7 in which said rails are pivoted at one of their ends to said transfer unit and at their other ends to a supporting stand for transverse swinging movement.

9. A conveyer structure according to claim 8 in which the supporting stand is connected to said conveyer section by diagonal braces which are connected to the rails and to said stand for lateral swinging movement.

10. A conveyer structure according to claim 9 in which said diagonal braces are connected to said conveyer section by a transverse member to which said rails are pivoted for relative transverse swinging movement.

11. A conveyer structure according to claim 8, in which said stand is carried by supporting wheels, and a braking unit carried by said stand for preventing rolling of the wheels.

12. A conveyer structure according to claim 8 in which the stand is adjustable to vary the height of the conveyer rails which it supports.

13. A conveyer structure according to claim 5 in which said conveyer section which supports said transfer unit is also composed of parallel conveyer rails, said transfer unit carrying a guide member which projects between certain of said rails to guide it along said supporting conveyer section.

14. A conveyer structure according to claim 13 including stop members carried by said supporting conveyer at the ends of said rails for engaging the opposed ends of said guide member.

15. A conveyer structure according to claim 13 in which said conveyer rails include anti-friction rolling elements and said transfer unit also includes anti-friction rolling elements, supporting structure for the last-named rolling elements, said supporting structure engaging and resting on the first-named rolling elements.

16. A conveyer structure according to claim 5 in which said transfer unit and the conveyer section supporting it are provided with cooperating stop members for limiting movement of the transfer unit along said conveyer section.

References Cited in the file of this patent

UNITED STATES PATENTS

| 718,092 | Clarke | Jan. 13, 1903 |
| 747,897 | Spangler | Dec. 22, 1903 |
| 1,810,512 | Worst | June 16, 1931 |
| 1,969,276 | Pevear | Aug. 7, 1934 |
| 2,760,617 | Bowen | Aug. 28, 1956 |

FOREIGN PATENTS

| 550,601 | France | Dec. 19, 1922 |